E. W. STULL.
MOTOR CONTROL SYSTEM.
APPLICATION FILED AUG. 27, 1906.

902,621.

Patented Nov. 3, 1908.

2 SHEETS—SHEET 1.

Witnesses
Oliver W. Sharman
Fred J. Kinsey

Inventor
Emmett W. Stull
By
Chas. E. Lord
Attorney

E. W. STULL.
MOTOR CONTROL SYSTEM.
APPLICATION FILED AUG. 27, 1906.

902,621.

Patented Nov. 3, 1908.

2 SHEETS—SHEET 2.

Witnesses

Inventor
Emmett W. Stull
By
Chas. E. Lord
Attorney

UNITED STATES PATENT OFFICE.

EMMETT W. STULL, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

MOTOR-CONTROL SYSTEM.

No. 902,621.   Specification of Letters Patent.   Patented Nov. 3, 1908.

Application filed August 27, 1906. Serial No. 332,134.

*To all whom it may concern:*

Be it known that I, EMMETT W. STULL, citizen of the United States, residing at Norwood, in the county of Hamilton and State of Ohio, have invented certain new and useful Improvements in Motor-Control Systems, of which the following is a full, clear, and exact specification.

My invention relates to electric controllers and especially to series-parallel controllers for motors having commutating poles.

It is found that by the use of additional poles placed midway between the main poles commutation is greatly assisted and motors can be worked at a much lower field strength than would otherwise be possible. Such being the case, it is the object of my present invention to provide a controller which not only controls the motors by connecting them in series and parallel relation and by cutting in and out a series resistance, but also regulates them by weakening their fields, thus allowing a strong torque at starting and a higher running speed.

To this end my invention consists in one aspect of the combination of a plurality of motors having commutating poles and a controller for connecting them in series and parallel relation.

In another aspect my invention consists of a plurality of motors and resistances, together with a controller arranged to connect said motors in series and parallel and to connect said resistances in series with the motors or in shunt to the motor field windings.

Other features of my invention will appear from the specification and drawings and will be particularly set forth in the claims.

Figure 1:
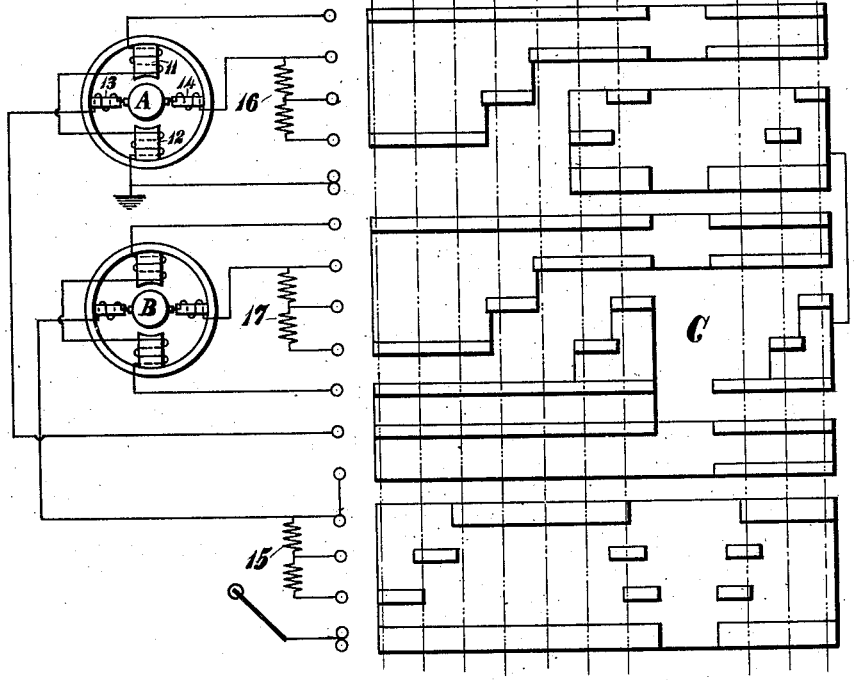
Figure 2:
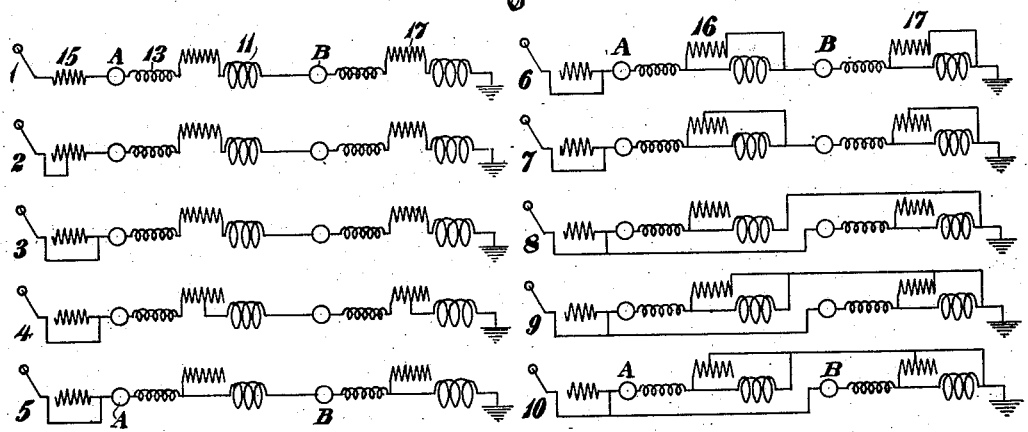
Figure 3:
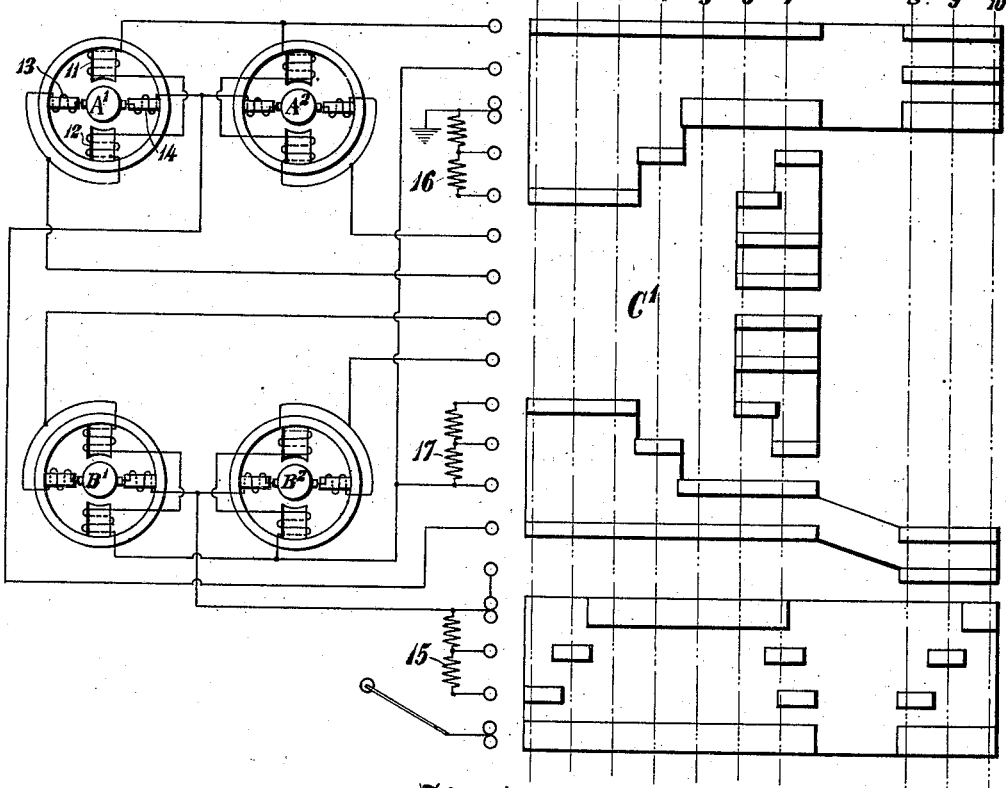
Figure 4:
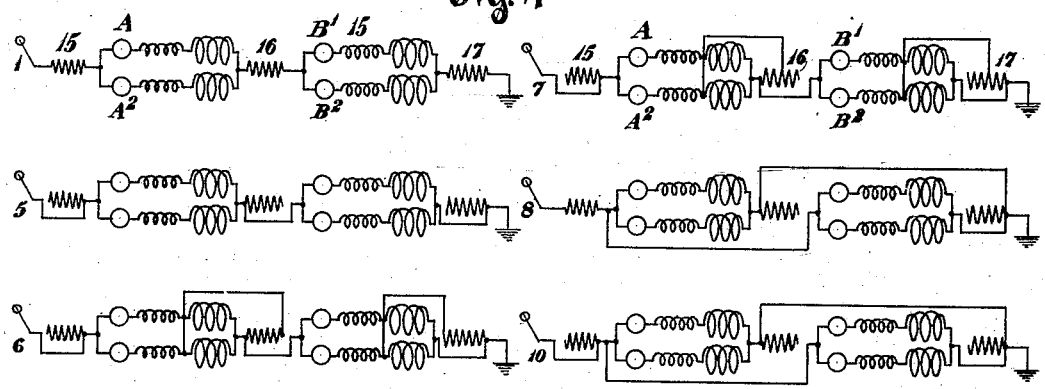

Figure 1 is a diagram showing a development of a two-motor controller embodying my invention. Fig. 2 is a set of simple diagrams showing the connections of the motors and resistances for the different positions of the controller of Fig. 1. Fig. 3 is a diagram showing a development of a four-motor controller embodying my invention; and Fig. 4 is a set of simple diagrams showing the connections of the motors and the resistances in the most important positions of the controller of Fig. 3. The diagrams of Figs. 2 and 4 are numbered to agree with the corresponding operative positions of the controller.

Referring first to Figs. 1 and 2, A and B are the motors to be controlled. These motors are shown as bipolar motors, though obviously these motors may have any desired number of poles. In addition to the main poles 11 and 12, series wound as is usual in railway motors, each motor also has two auxiliary poles 13 and 14 arranged directly over the coils undergoing commutation and having windings in series with the motors. These commutating poles, as they are now generally called, serve to assist commutation in a manner so well understood that it is not deemed necessary to explain it here. In Figs. 1 and 3, the armatures of the motors are shown connected between the windings of the commutating poles, but manifestly both commutating windings may be on the same electrical side of the motor, as shown in Figs. 2 and 4.

The motors A and B are regulated by a series-parallel controller, the drum C of which, as shown in the development of Fig. 1, has 10 operative positions. The first seven of these positions are series positions, while positions 8, 9 and 10 are parallel positions. The reversing switch and its connections are omitted from the diagram in order to add to the simplicity of the latter. Besides the two motors A and B, there are resistances 15, 16 and 17 under the control of the controller. Each of these resistances may be composed of a plurality of units and in the drawing each is shown with two units, though obviously any number may be used. The resistance 15 is arranged to be connected in series with the two motors for starting purposes, and to be cut out a unit at a time, as indicated in diagrams #1, #2 and #3 of Fig. 2. The resistances 16 and 17 are also connected in series with the motors for starting purposes and are cut out simultaneously a unit at a time, as shown in diagrams #3, #4 and #5 of Fig. 2. Moreover, when the controller is moved into position 6, the resistances 16 and 17 are connected in shunt to the main field windings of the motors A and B respectively, as shown in diagram #6 of Fig. 2, thus weakening the fields of these motors and further increasing the motor speed. In position 7 the controller cuts out one section of each of the resistances 16 to 17, thus diminishing the resistance of the shunt around the motor field windings and serving to increase the motor speed both by diminishing the motor field strength and by diminishing the resistance of the motor circuit. Because of the commutating poles this field weakening can be safely done without causing sparking at the brushes.

When the controller is moved to position 8, the motor connections are changed from series to parallel and the resistances 16 and 17 are disconnected. At this first parallel position in this modification the motors have no external resistance in circuit with them. In position 9 the resistances 16 and 17 are again connected in shunt respectively to the field windings of the motors A and B, while in position 10 this shunt resistance is diminished to still further increase the motor speed.

In the arrangement shown in Figs. 3 and 4 instead of the single motors A and B there are pairs of motors $A^1$ and $A^2$, and $B^1$ and $B^2$. Each individual motor has main and commutating poles as in Fig. 1. The two motors of a pair are controlled as a unit, and the two pairs are connected in series and in parallel positions by the drum $C^2$ in much the same manner as the two single motors were in the arrangement of Fig. 1. As in the controller in Fig. 1 there are the resistances 15, 16 and 17, but there are two additional controller contacts. These two extra contacts are for the extra connections which must lead from the controller to the two additional motors, for not only is each terminal of each motor connected to a controller contact but a point intermediate between the armature and main field windings is likewise so connected so that the field windings may be shunted by the proper resistances. These latter connections should be separate for each motor, so that there shall be no internal interconnection between the two motors of a pair. For this reason when a group of motors is used instead of a single motor, each additional motor necessitates an additional controller contact.

As in the arrangement of Fig. 1 the controller drum $C^1$ of Fig. 3 has 10 operative positions, 1 to 7 being series positions and 8 to 10 parallel positions. Although the arrangement of controller segments in Fig. 3 is different from that in Fig. 1, yet between positions 1 to 7 the controller connects the motors and resistances in practically the same manner as in Fig. 1. Therefore some of the less important connection diagrams are omitted in Fig. 4. In position 8, however, the controller of Fig. 3 again connects in resistance 15 in series, while the two pairs of motors are connected in parallel. When the controller is moved to positions 9 and 10, the halves of the resistance 15 are successively cut out of circuit. When a pair of motors is in the unit of control as in Fig. 3, instead of a single motor as in Fig. 1, it is oftentimes disadvantageous, even with commutating poles to prevent sparking at the commutators, to attempt to shunt the field windings in the full "on" position of the controller, because to do so necessitates either the use of a separate resistance for each motor of a pair or else a permanent connection between the two motors on both sides of the field windings. The first of these alternatives requires a complicated system of connections though it, as does also the other alternative, comes under my broad invention, while the second causes any inequality in the currents taken by the two motors of a pair to be greatly and progressively magnified, resulting in an overload on one motor of a pair and a low efficiency in the other motor. For this reason the main field windings of the motors are not shunted in the parallel positions in Figs. 3 and 4; instead the resistance 15 is reinserted in circuit and then gradually cut out.

Obviously instead of a pair of motors, a group of any number of motors could be used.

Many changes in the particular arrangements here shown and described will readily occur to any one skilled in the art and in the following claims I aim to cover all modifications which come within the spirit and scope of my invention.

What I claim as new and desire to secure by Letters Patent is:—

1. In combination, a motor having commutating poles, a controller therefor, and a plurality of resistances, one of said resistances being arranged so that it can only be cut out or connected in series with the motor, while another resistance is arranged to be connected either in series with the motor, or in shunt to the motor field windings.

2. In combination, a motor having anti-sparking windings, a controller, and a plurality of sets of resistances, one of said sets being arranged so that it can only be cut out or connected in series with the motor, while another set is arranged to be connected either in series with the motor, in shunt to the motor field windings, or to be cut out.

3. In combination, a motor having commutating poles, a controller, and a plurality of sets of resistances, one of said sets being arranged so that it can only be cut out or connected in series with the motor, while another set is arranged so that in whole or in part it can be connected either in series with the motor, in shunt to the motor main field windings, or cut out.

4. In combination, a plurality of motors having commutating windings, a controller therefor, a plurality of resistances, and connections whereby the controller can connect said motors in series with all of said resistances and can cut out said resistances gradually, and can also connect certain of said resistances in shunt to the motor main field windings.

5. In combination, a plurality of motors having anti-sparking windings, a controller therefor, a plurality of resistances, and connections whereby the controller can connect said motors in series with said resistances, and can connect certain of said resistances in shunt to the motor field windings.

6. In combination, a motor having main and auxiliary poles, a controller therefor, and a plurality of resistances in series, one of which resistances is arranged to be cut out separately, and others of which are arranged to be cut out simultaneously.

7. In combination, a plurality of motors having commutating poles, a controller therefor, a plurality of resistances, and connections whereby said controller can connect said motors in series with all of said resistances, and can graduallly cut out one of said resistances separately and others of said resistances simultaneously.

8. In combination, a plurality of motors provided with commutating poles, a controller therefor, a plurality of resistances, and connections whereby said controller can connect the motors in series and in parallel with each other and in series with all of said resistances, can cut out said resistances, and can shunt the motor main field windings by certain of said resistances.

9. In combination, a plurality of motors provided with commutating windings, a plurality of resistances, and a controller arranged to connect said motors in series and in parallel, and said resistances in series with the motors or in shunt to the motor field windings.

10. In combination, a motor, a controller therefor, and a plurality of resistances, one of said resistances being arranged so that it can only be cut out or connected in series with the motor, while another resistance is arranged to be connected either in series with the motor, or in shunt to the motor field windings.

11. In combination, a motor, a controller therefor, and a plurality of sets of resistances, one of said sets being arranged so that it can only be cut out or connected in series with the motor, while another of said sets is arranged to be connected either in series with the motor or in shunt to the motor field windings.

12. In combination, a motor, a controller, and a plurality of sets of resistances, one of said sets being arranged so that it can only be cut out or connected in series with the motor, while another of said sets is arranged to be connected in whole or in part in series with the motor or in shunt to the motor field windings.

13. In combination, a plurality of motors, a controller therefor, a plurality of resistances, and connections whereby the controller can connect said motors in series with all of said resistances and can cut out said resistances gradually, and can also connect certain of said resistances in shunt to the motor field windings.

14. In combination, a plurality of motors, a controller therefor, a plurality of resistances, and connections whereby the controller can connect said motors in series with all of said resistances, and can connect certain of said resistances in shunt to the motor field windings.

15. In combination, a motor, a controller therefor, and a plurality of resistances in series, one of which resistances is arranged to be gradually cut out separately and others of which are arranged to be gradually cut out simultaneously.

16. In combination, a plurality of motors, a controller therefor, a plurality of resistances, and connections whereby said controller can connect said motors in series with all of said resistances and can cut out one of said resistances separately and others of said resistances simultaneously.

17. In combination, a plurality of motors, a controller therefor, a plurality of resistances, and connections whereby said controller can connect the motors in series and in parallel with each other and in series with all of said resistances and can shunt the motor field windings by certain of the resistances.

18. In combination, a plurality of motors and resistances, and a controller arranged to connect said motors in series and in parallel and said resistances in series with the motors or in shunt with the motor field windings.

19. In combination, a plurality of motors, a series-parallel controller therefor, a plurality of resistances, and connections whereby the controller can connect certain of said resistances in series with said motors, and certain of said resistances in shunt to the motor field windings when the motors are either in series or in parallel.

20. In combination, a plurality of motors, a series-parallel controller therefor, a plurality of resistances, and connections whereby the controller can connect certain of said resistances in series with said motors and can connect certain of said resistances in shunt to the motor field windings when the motors are connected in parallel.

In testimony whereof I affix my signature, in the presence of two witnesses.

EMMETT W. STULL.

Witnesses:
RUBELLA ROBINSON,
FRED J. KINSEY.